(12) United States Patent
Gabell

(10) Patent No.: US 10,838,104 B2
(45) Date of Patent: Nov. 17, 2020

(54) GRAVIMETER ASSEMBLY

(71) Applicant: HZW Holdings Pty Ltd, Perth (AU)

(72) Inventor: Andrew Raymond Gabell, Perth (AU)

(73) Assignee: HZW Holdings Pty Ltd, Perth (AU)

( * ) Notice: Subject to any disclaimer, the term of this patent is extended or adjusted under 35 U.S.C. 154(b) by 174 days.

(21) Appl. No.: 16/302,662

(22) PCT Filed: Oct. 2, 2017

(86) PCT No.: PCT/AU2017/051075
§ 371 (c)(1),
(2) Date: Nov. 18, 2018

(87) PCT Pub. No.: WO2018/064716
PCT Pub. Date: Apr. 12, 2018

(65) Prior Publication Data
US 2019/0219733 A1    Jul. 18, 2019

(30) Foreign Application Priority Data

Oct. 4, 2016  (AU) ................................. 2016904026

(51) Int. Cl.
*G01V 7/16*    (2006.01)
*G01S 17/58*   (2006.01)
(Continued)

(52) U.S. Cl.
CPC ............... *G01V 7/16* (2013.01); *G01S 17/58* (2013.01); *G01S 17/86* (2020.01); *G01S 17/875* (2013.01); *G01S 19/13* (2013.01); *G01V 7/04* (2013.01)

(58) Field of Classification Search
CPC .............. G01V 7/16; G01V 7/00; G01V 7/02
See application file for complete search history.

(56) References Cited

U.S. PATENT DOCUMENTS 3,731,537 A * 5/1973 Trageser ................. G01V 7/10
73/382 R
4,509,131 A * 4/1985 Krasnjanski ............ G01P 3/803
324/179

(Continued)

FOREIGN PATENT DOCUMENTS

AU    2002304979 B2    9/2004

OTHER PUBLICATIONS

Pierrottet et al., Navigation Doppler lidar sensor for precision altitude and vector velocity measurements flight test results, Proc. SPIE 8044, Sensors and Systems for Space Applications IV, 80440S, May 23, 2011.

(Continued)

*Primary Examiner* — David A. Rogers
(74) *Attorney, Agent, or Firm* — Winstead PC

(57) ABSTRACT

Provided is an aircraft 10 which has been configured for conducting airborne gravimetry surveys, comprising a gravimeter 14, a global navigation satellite system (GNSS) receiver 18 arranged in signal communication with the gravimeter 14, as well as a Doppler lidar system 20 arranged in signal communication with the gravimeter 14. The lidar system 20 is configured to determine a vertical velocity of the aircraft 10 at a predetermined time, with a time signal from the GNSS receiver 18 used to operatively synchronise both the gravimeter 14 and lidar system 20 measurements. In this manner, a gravitational acceleration measurement of the gravimeter 14 is differentially isolable from a kinematic acceleration derivable from the synchronous lidar measurement.

17 Claims, 4 Drawing Sheets

(51) Int. Cl.
*G01S 17/875* (2020.01)
*G01V 7/04* (2006.01)
*G01S 17/86* (2020.01)
*G01S 19/13* (2010.01)

(56) References Cited

U.S. PATENT DOCUMENTS

| | | | | |
|---|---|---|---|---|
| 5,341,681 A * | 8/1994 | Molny | | G01V 7/02 73/382 G |
| 5,402,340 A * | 3/1995 | White | | G01C 21/005 701/504 |
| 5,557,397 A * | 9/1996 | Hyde | | G01C 11/02 356/2 |
| 5,661,649 A * | 8/1997 | Carson | | G01V 7/16 702/2 |
| 5,728,935 A * | 3/1998 | Czompo | | G01V 7/16 73/382 G |
| 5,878,356 A * | 3/1999 | Garrot, Jr. | | G01C 11/02 348/144 |
| 6,082,194 A * | 7/2000 | Gladwin | | G01V 7/16 73/382 G |
| 6,804,608 B2 * | 10/2004 | Lee | | G01C 11/025 702/5 |
| 6,837,106 B2 * | 1/2005 | Etkin | | G01N 7/16 73/382 G |
| 7,542,850 B2 * | 6/2009 | Humphrey | | G01V 7/16 324/330 |
| 8,347,711 B2 * | 1/2013 | Rice | | G01P 15/08 73/382 R |
| 8,386,180 B2 * | 2/2013 | Davies | | G01V 11/00 702/5 |
| 9,140,819 B2 * | 9/2015 | Moir | | G01V 7/16 |
| 2002/0092350 A1 * | 7/2002 | Etkin | | G01V 7/16 73/382 G |
| 2003/0033086 A1 * | 2/2003 | Lee | | G01C 11/025 702/5 |
| 2006/0004519 A1 | 1/2006 | Humphrey et al. | | |
| 2009/0044621 A1 * | 2/2009 | Brett | | G01V 7/00 73/382 R |
| 2011/0265563 A1 * | 11/2011 | Van Kann | | G01V 7/02 73/382 G |
| 2012/0305741 A1 * | 12/2012 | Sapir | | F16M 11/123 248/636 |
| 2014/0081595 A1 | 3/2014 | White et al. | | |
| 2017/0108612 A1 * | 4/2017 | Aguib | | G01V 7/06 |

OTHER PUBLICATIONS

Bruton, Improving the Accuracy and Resolution of SINS/DGPS Airborne Gravimetry, University of Calgary, Dec. 2000.
International Search Report, dated Nov. 1, 2017, Andrew Walker (Authorized Officer).

* cited by examiner

GRAVIMETER ASSEMBLY

TECHNICAL FIELD

This invention relates to a gravimeter assembly, an aircraft configured for gravimetry, and a gravimetry method.

BACKGROUND ART

The following discussion of the background art is intended to facilitate an understanding of the present invention only. The discussion is not an acknowledgement or admission that any of the material referred to is or was part of the common general knowledge as at the priority date of the application.

Gravimetry is generally the measurement of the strength of a gravitational field. Gravimetry may be used when either the magnitude of a gravitational field or the properties of matter responsible for the creation of such a field are of interest.

The most common conventional airborne method for measuring a scalar gravity field over a surface of the earth is from an aircraft fitted with a 3-axis stabilised gravimeter mounted on a floor of the aircraft. Such a gravimeter typically has a main sensor (an accelerometer) mounted vertically on a 3-axis gyro-stabilised platform.

The gyro-stabilised platform isolates the main sensor from the rotations of the aircraft and the input axis of the sensor is kept vertical in the relevant inertial frame of reference to minimise contamination of the signal with horizontal accelerations. The main sensor measures the total vertical accelerations to which it is subjected, being a combination of the vertical accelerations due to inertial, or kinematic, motion, as well as the accelerations due to gravity.

A second airborne method involves the use of so-called Strapdown Inertial Navigation System (SINS) fixed to the body of an aircraft. A SINS generally contains two sensor triads. The first is an orthogonal set of accelerometers that measure specific force and the second is an orthogonal set of gyroscopes that measure angular velocity. These triads are strapped to the body of the host vehicle, such as an aircraft, and therefore go through the full range of motion experienced by the aircraft. If the SINS contains a triad of accelerometers and a triad of gyroscopes, then the three vector components of the accelerations (including the vertical component) can be determined after correction for aircraft attitude.

One basic difficulty with gravimetry from a moving aircraft is the fact that on grounds of the principle of equivalence, an accelerometer indicates the sum of gravitational acceleration and kinematic acceleration. If a measurement of only the gravitational acceleration is desired, it is necessary to eliminate the kinematic acceleration resulting from the motion of the aircraft. As such, the principle of equivalence dictates that without this additional information, it is not possible to separate the desired parameter, being the vertical acceleration due to gravity, from the total accelerations measured.

For this reason, some manner of global navigation satellite system (GNSS) is used. A satellite navigation receiver, most commonly a Global Positioning System (GPS) receiver, is connected to an antenna mounted on the aircraft fuselage above the gravimeter. The conventional methods use GPS to measure the vertical inertial accelerations. The inertial accelerations from the GPS can then be subtracted from the total accelerations measured by the gravimeter to give the vertical acceleration due to gravity.

However, the conventional methods have several drawbacks. For instance, the requirement to use GPS provides a limit on the resolution of the resulting data, as long-wavelength filters (commonly in the range of 60 to 100 seconds) are required in order to produce measurements of the vertical accelerations to the required level of accuracy. As an aircraft generally moves a considerable distance in this time, the resolution of the resulting data is therefore measured in kilometres rather than metres.

Additionally, results from GPS are more accurate if the data is differentially processed. That is, if the data from the GPS on the aircraft is processed in tandem with data from a static GPS receiver, i.e. a base station, after completion of the data acquisition flight. Although real-time differential GPS data services are available commercially, these result in less accurate gravity data compared to differentially post-processed data. This means it is impossible to produce high quality gravity data in close to real time.

Finally, differentially processed GPS data requires common satellites between the aircraft-mounted GPS receiver and the base station GPS receiver in order to provide the most accurate results. Ideally, the same GPS satellites should be visible to both the aircraft-mounted GPS receiver and the base station. However, this can vary widely depending on the latitude of operation and the available GPS constellation at any given time of day, which can limit the effective range of a gravimeter mounted in an aircraft.

The present invention seeks to propose possible solutions, at least in part, in amelioration of some of the known shortcomings in the art.

SUMMARY OF THE INVENTION

It is to be appreciated by the skilled addressee that reference herein to a gravimeter generally includes reference to a 3-axis stabilised and/or a SINS gravimeter, except if a particular restriction, limitation and/or configuration excludes the use of such a gravimeter.

According to a first aspect of the invention there is provided a gravimeter assembly comprising:

a gravimeter;

at least one global navigation satellite system (GNSS) receiver arranged in signal communication with the gravimeter; and a Doppler lidar system arranged in signal communication with the gravimeter, the lidar system configured to determine a vertical velocity of the assembly at a predetermined time, a time signal from the GNSS receiver operatively synchronising both gravimeter and lidar measurements, so that a gravitational acceleration measurement of the gravimeter is differentially isolable from a kinematic acceleration derivable from the synchronous lidar measurement.

Typically, the gravimeter comprises a three-axis stabilised platform with an accelerometer having a vertically arranged input axis to prevent signal contamination from horizontal accelerations.

Typically, the Doppler lidar system is coaxially arranged on the input axis.

Typically, the GNSS receiver and/or a suitable antenna thereof is coaxially arranged on the input axis. It is to be appreciated that such a GNSS receiver, either alone or in combination with any suitable antenna arrangement is hereinafter collectively referred to as 'GNSS receiver'.

Typically, the Doppler lidar system includes a laser generator that produces a single frequency laser beam, and a frequency modulator arranged in signal communication with the laser generator.

Typically, the frequency modulator receives the laser beam from the laser generator, and linearly modulates the frequency of the laser beam to produce a triangular waveform with a high degree of linearity.

Typically, the Doppler lidar system includes an amplifier arranged in signal communication with the frequency modulator, said amplifier configured to receive and amplify a first portion of the modulated laser beam.

Typically, the Doppler lidar system includes at least one photo transceiver arranged in communication with the amplifier, said photo transceiver configured to transmit a part of the first portion of the amplified laser beam from the amplifier, and to subsequently receive reflected radiation from such transmitted laser beam.

Typically, the Doppler lidar system includes at least three photo transceivers.

Typically, each photo transceiver is configured to mix the received reflected radiation with a part of a second portion of the modulated laser beam for optical heterodyne detection.

Typically, each of the at least three photo transceivers are aimed to transmit the laser beam in a different direction, and are stationary relative to each other.

Typically, the received reflected radiation from each part of the transmitted first portion of the laser beam is compared with a second portion of the modulated laser beam to determine a frequency difference between the frequency of the received reflected radiation and the frequency of the modulated laser beam to determine the vertical velocity of the assembly.

Typically, the GNSS receiver is configured to operatively measure a vertical kinematic acceleration of the assembly.

Typically, the assembly includes a second GNSS receiver operatively located distal from the assembly to allow differential processing of vertical kinematic acceleration measurements from the first GNSS receiver.

In one example, the GNSS receiver and Doppler lidar system are mounted on the gravimeter.

Typically, the GNSS receiver and Doppler lidar system are mounted on the three-axis stabilised platform.

Typically, the assembly is installed in an aircraft.

Typically, the assembly is installed in an aircraft such that the GNSS receiver has a clear view of the sky at a top of the aircraft, with the Doppler lidar system having a clear view of the ground below the aircraft.

In one example, the assembly is installed in an unmanned aerial vehicle (UAV).

According to a second aspect of the invention there is provided an aircraft configured for gravimetry, said aircraft comprising:

a gravimeter;

at least one global navigation satellite system (GNSS) receiver arranged in signal communication with the gravimeter; and a Doppler lidar system arranged in signal communication with the gravimeter, the lidar system configured to determine a vertical velocity of the aircraft and/or gravimeter at a predetermined time;

wherein a time signal from a GNSS receiver operatively synchronises both gravimeter and lidar measurements, so that a gravitational acceleration measurement of the gravimeter is differentially isolable from a kinematic acceleration derivable from the synchronous lidar measurement.

Typically, the gravimeter comprises a three-axis stabilised platform with an accelerometer having a vertically arranged input axis to prevent signal contamination from horizontal accelerations.

Typically, the Doppler lidar system is coaxially arranged on the input axis.

Typically, the GNSS receiver is coaxially arranged on the input axis.

Typically, the Doppler lidar system includes a laser generator that produces a single frequency laser beam, and a frequency modulator arranged in signal communication with the laser generator.

Typically, the frequency modulator receives the laser beam from the laser generator, and linearly modulates the frequency of the laser beam to produce a triangular waveform with a high degree of linearity.

Typically, the Doppler lidar system includes an amplifier arranged in signal communication with the frequency modulator, said amplifier configured to receive and amplify a first portion of the modulated laser beam.

Typically, the Doppler lidar system includes at least one photo transceiver arranged in communication with the amplifier, said photo transceiver configured to transmit a part of the first portion of the amplified laser beam from the amplifier, and to subsequently receive reflected radiation from such transmitted laser beam.

Typically, the Doppler lidar system includes at least three photo transceivers.

Typically, each photo transceiver is configured to mix the received reflected radiation with a part of a second portion of the modulated laser beam for optical heterodyne detection.

Typically, each of the at least three photo transceivers are aimed to transmit the laser beam in a different direction, and are stationary relative to each other.

Typically, the received reflected radiation from each part of the transmitted first portion of the laser beam is compared with a second portion of the modulated laser beam to determine a frequency difference between the frequency of the received reflected radiation and the frequency of the modulated laser beam to determine the vertical velocity of the aircraft.

Typically, the GNSS receiver is configured to operatively measure a vertical kinematic acceleration of the aircraft.

In one example, the GNSS receiver and/or Doppler lidar system are mounted on the gravimeter.

Typically, the GNSS receiver and/or Doppler lidar system are mounted on the three-axis stabilised platform.

According to a third aspect of the invention there is provided a gravimetry method comprising the steps of:

mounting a gravimeter assembly, in accordance with the first aspect of the invention, in an aircraft;

flying a gravimetry survey with the aircraft; and synchronising both the gravimeter and lidar measurements during said survey with a time signal from the GNSS receiver, so that a gravitational acceleration measurement of the gravimeter is differentially isolable from a kinematic acceleration derivable from the synchronous lidar measurement.

BRIEF DESCRIPTION OF THE DRAWINGS

The description will be made with reference to the accompanying drawings in which.

DETAILED DESCRIPTION OF EMBODIMENTS

Figure 1:
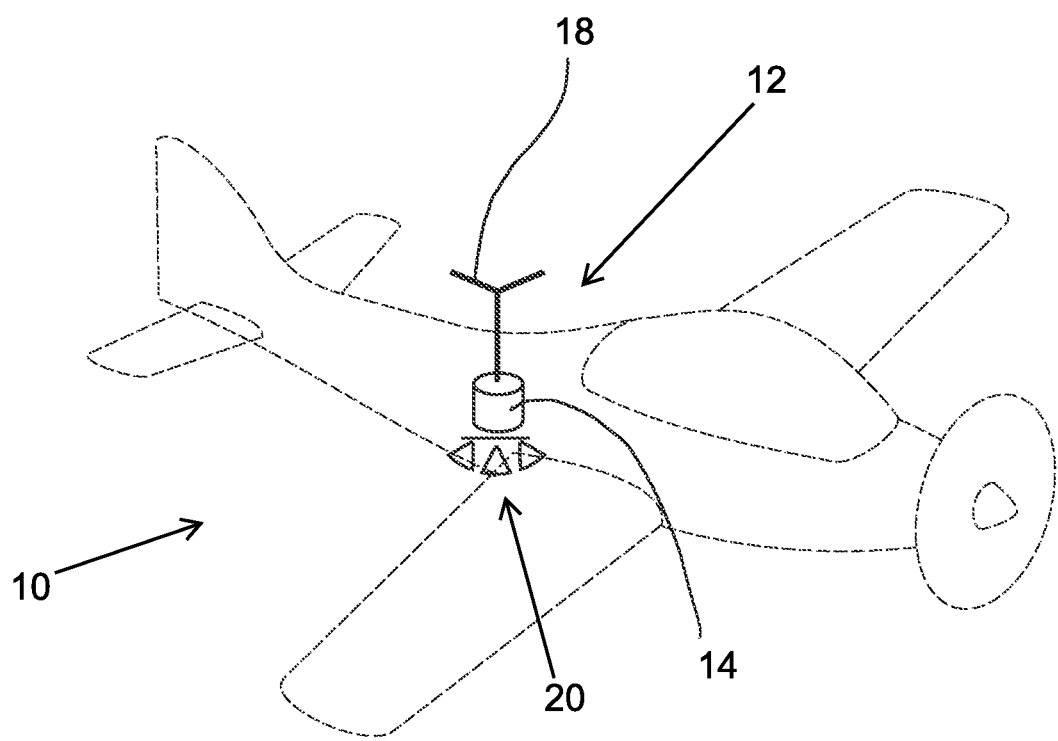
FIG. 1 is a diagrammatic perspective-view representation of an aircraft with one example of a gravimetry assembly, in accordance with an aspect of the invention.

Further features of the present invention are more fully described in the following description of several non-limiting embodiments thereof. This description is included solely for the purposes of exemplifying the present invention to the skilled addressee. It should not be understood as a restriction on the broad summary, disclosure or description of the invention as set out above. In the figures, incorporated to illustrate features of the example embodiment or embodiments, like reference numerals are used to identify like parts throughout.

With reference now to FIG. 1 of the accompanying drawings, there is shown an aircraft 10 which has been configured for conducting airborne gravimetry surveys. In this example, the aircraft 10 comprises a gravimeter 14, a global navigation satellite system (GNSS) receiver 18 arranged in signal communication with the gravimeter 14, as well as a Doppler lidar system 20 arranged in signal communication with the gravimeter 14.

The lidar system 20 is configured to determine a vertical velocity of the aircraft 10 at a predetermined time, with a time signal from the GNSS receiver 18 used to operatively synchronise both the gravimeter 14 and lidar system 20 measurements. In this manner, a gravitational acceleration measurement of the gravimeter 14 is differentially isolable from a kinematic acceleration derivable from the synchronous lidar measurement.

In this manner and according to the principle of equivalence, the skilled addressee will appreciate that it is possible to eliminate the kinematic acceleration resulting from the motion of the aircraft 10, making it possible to separate the vertical acceleration due to gravity from the total accelerations measured.

It is to be appreciated that lidar, (Light Imaging Detection and Ranging) generally uses ultraviolet, visible, or near infrared light to image objects with very high resolutions. Such high resolution can be achieved due to the wavelength of signals in the light spectrum, e.g. wavelengths between 100 nm and 100 μm. Otherwise, using technologies such as radar (Radio Detection and Ranging), which uses signals in the radio frequency spectrum having wavelengths of 1 mm to 100 km, does generally not provide sufficient resolution to facilitate differential isolation between a gravitational acceleration measurement and a kinematic acceleration, as is required by the present invention.

Figure 2:
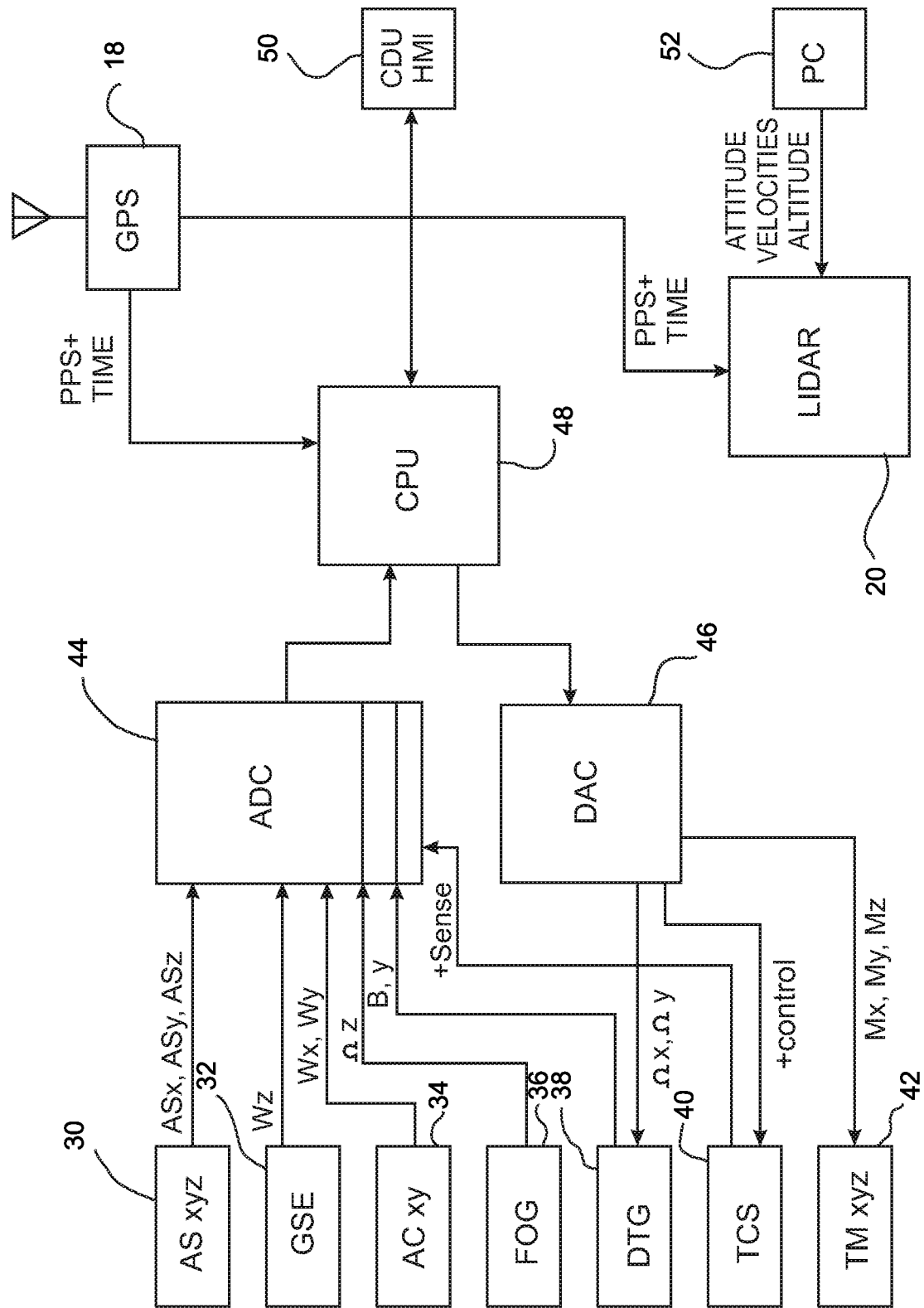
FIG. 2 is a diagrammatic representation of signal communication between components of one example of the gravimetry assembly of FIG. 1.

By way of background, a general description of an example of components comprising one particular type of gravimeter 14 is now provided with reference to FIG. 2, showing typical components comprising the gravimeter and signal flow between these various components or sub-systems. However, it will be appreciated by the skilled addressee that various other types or configurations of the gravimeter are possible and within the scope of this invention.

As such, the exemplified embodiment of gravimeter 14 typically includes a vertical accelerometer, or gravity sensing element (GSE) 32, having a suspension design to minimise effects of cross-coupling, an undesirable effect which contaminates gravity measurements with components of horizontal accelerations induced by aircraft motion. The vertically oriented GSE 32 is installed on a three-axis gyro stabilised platform 16 with a Schuler-tuned integral correction circuit. The correction circuit uses external information on latitude and vehicle velocity from the GNSS, typically a Global Positioning System (GPS), receiver 18 to dampen the platform 16 during aircraft motion.

The gyro stabilized platform 16 is generally located in a three-axis gimbal suspension, which includes a dynamically tuned gyro (DTG) 38, two horizontal accelerometers ACx and ACy 34, and a fiber-optic gyro (FOG) 36 with a vertical sensitive axis. Output signals Wx and Wy from accelerometers 34, output signal Wz from the GSE 32, output signals B and y from DTG angle sensors 38, and the FOG 36 output $\Omega z$, go to the central processor unit (CPU) 48 via the analog-to-digital converter (ADC) 44.

ASx, ASy, ASz angle stabilization sensors 30 are installed on the gimbal suspension axes and on the vertical axis of the platform 16 to measure pitch and roll angles and the heading. DTG control signals $\Omega x$ and $\Omega y$, generated in the CPU 48, go to the DTG torque sensors 38 via the digital-to-analogue converter (DAC) 46. Servo system control signals Mx, My and Mz generated in the CPU 48 typically go to the servo system torque motors TMx and TMy 42 via the DAC 46 and a power amplifier.

Current proportional to the vertical apparent acceleration Wz runs in the measurement coil of the GSE force sensor and in a reference resistor serially connected to a coil. An output signal Wz, in the form of the voltage read from the reference resistor goes to the CPU 48 via the ADC 44. A reference current, which balances a fixed value of the gravitational force, is applied to a second winding of the GSE force sensor.

The integrated microprocessor or CPU 48 controls the servo system, which stabilizes the platform 16, maintains a temperature control circuit (TCS) 40, and provides GSE output signal processing. The Temperature Control System (TCS) 40 generally provides constant temperature for all sensing elements. As mentioned above, the pulse-per-second plus time (PPS+TIME) from the satellite navigation receiver 18 is input to both the gravimeter 14 and the Doppler lidar system 20 to synchronise the measurement of velocities and accelerations by each of these sub-systems.

Gravimeter control commands, data communication, gravimetric and navigation data display, and preliminary processing and recording on hard disk for post-processing are provided via the external control and display unit (CDU) 50. A general purpose computer, such as a personal computer (PC) 52 is generally used for such post-processing.

As mentioned above, other forms and/or configurations of gravimeters are possible and within the scope of this disclosure. Similarly, depending on a specific configuration of gravimeter, communication between the various components may be different from the exemplified embodiment, as will be understood by the skilled addressee.

Figure 3:
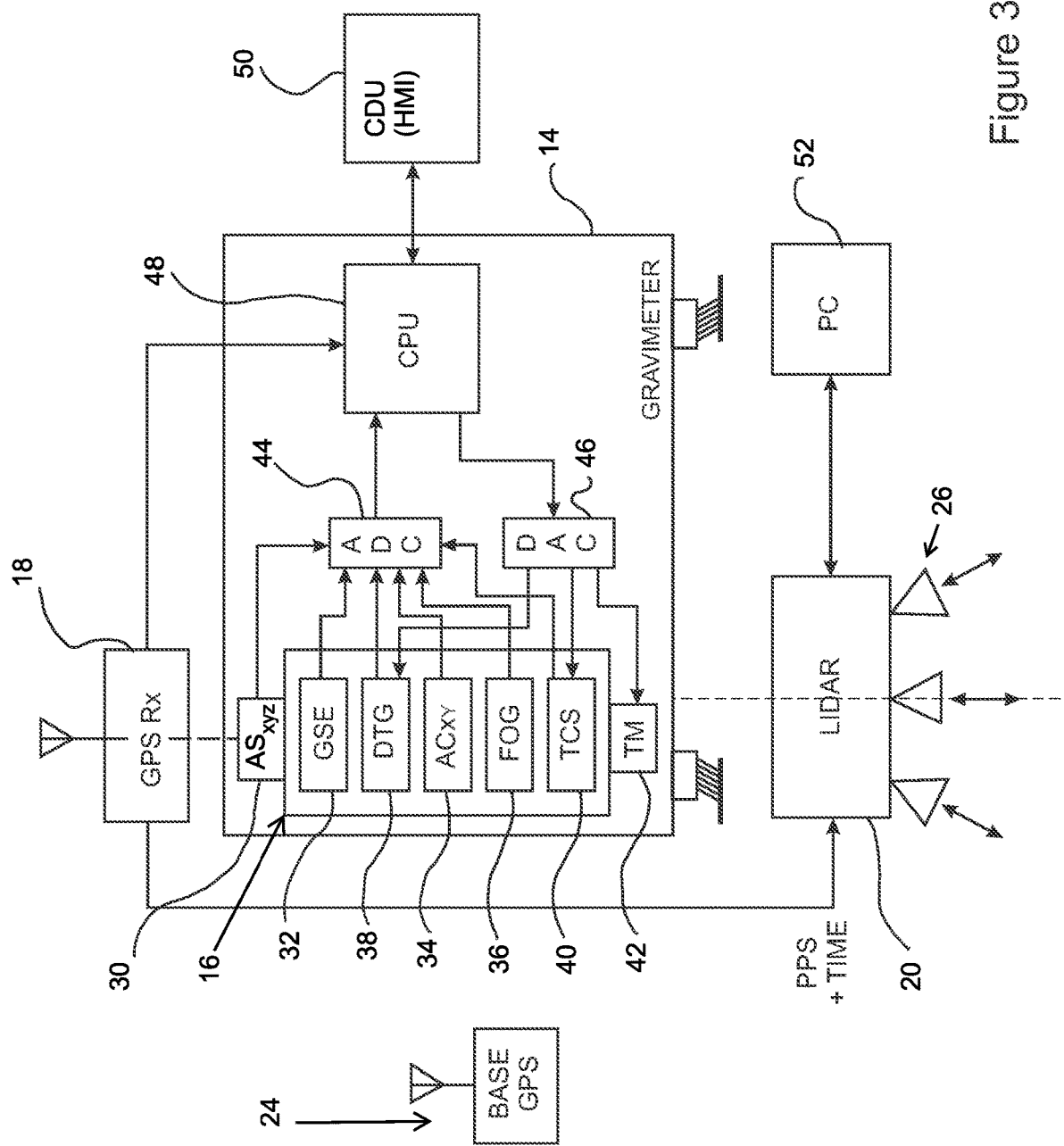
FIG. 3 is a diagrammatic representation of loosely integrated components comprising one example of the gravimetry assembly of FIG. 1.
Figure 4:
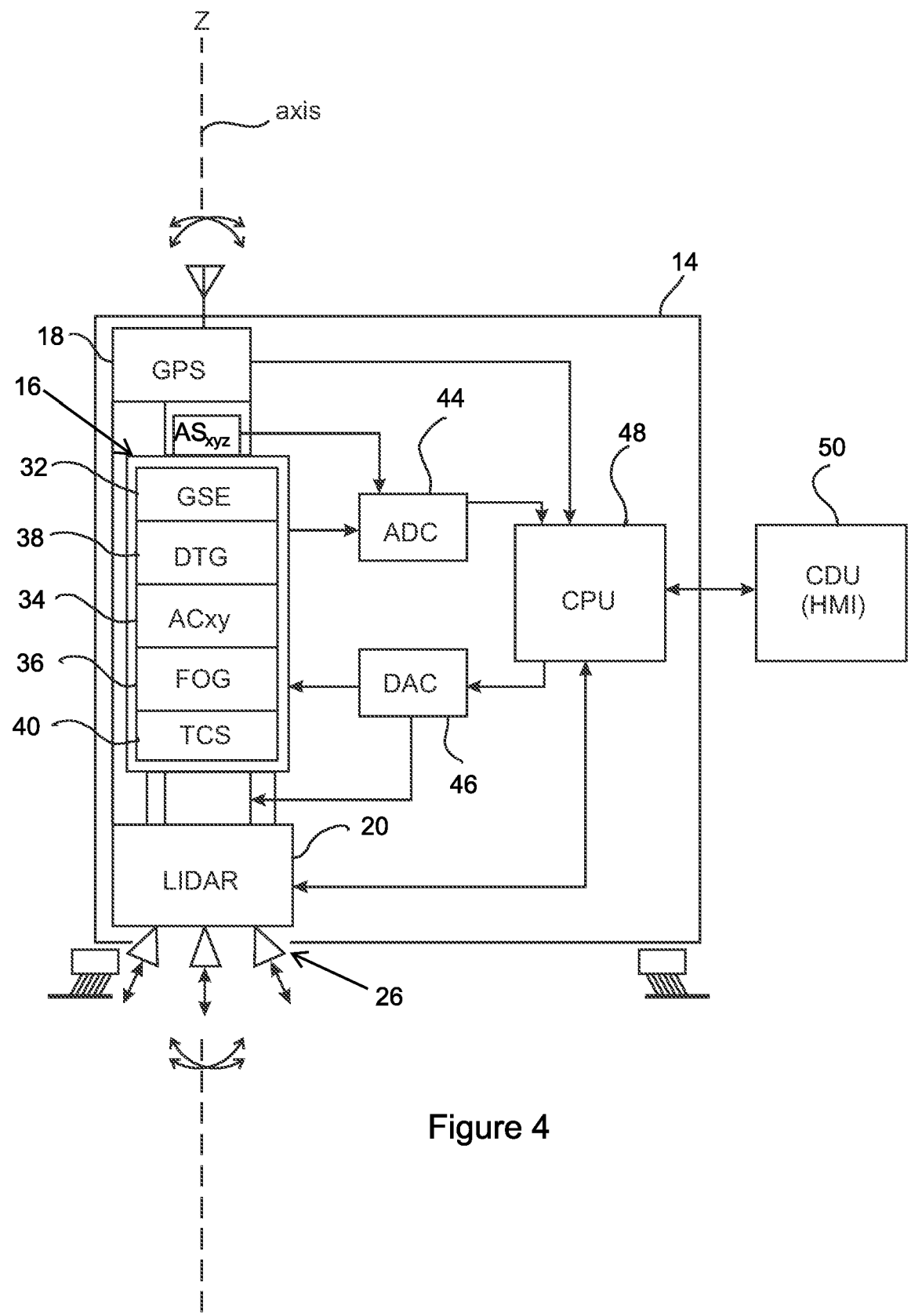
FIG. 4 is a diagrammatic representation of tightly integrated components comprising one example of the gravimetry assembly of FIG. 1.

With reference now to FIGS. 3 and 4 of the drawings, there are shown two different modes of the assembly 12. FIG. 3 shows a so-called "loose integration" between the lidar system 20 and the GSE 32 of the gravimeter 14. Similarly, FIG. 4 shows a "tight integration" between the lidar system 20 and the GSE 32 of the gravimeter 14.

Importantly, as mentioned above, the GSE accelerometer 32 has a vertically arranged input axis (indicated by the Z-axis) to prevent signal contamination from horizontal accelerations during use. As such, the closer the lidar and/or GNSS systems 18 and 20 are positioned in-line with the GSE's input axis, the more accurate measurements are possible.

In the loose integration example of FIG. 3, the gravimeter 14 is fixed to the aircraft fuselage 10 and the GPS satellite navigation receiver 18 is mounted on the top of the aircraft fuselage vertically above the gravimeter 14, as close as possible to the upward projection of the z-axis of the input axis of the gravimeter 14. The Doppler lidar system 20 is mounted on the bottom of the aircraft fuselage, as close as possible to the downward projection of the z-axis of the input axis of the gravimeter 14.

However, it is to be appreciated that there is a practical misalignment from the z-axis when the respective components are mounted in this manner, hence a "loose integration between the components.

In contrast, FIG. 4 shows a "tight integration" of the Doppler lidar system 20 with the gravimeter 14. In this embodiment, the Doppler lidar system's transceiver lenses are mounted directly on the 3-axis stabilised platform 16 mounted, in turn, on the gravimeter 14. This allows accurate alignment with the input axis of the GSE 32. In such an example, the Doppler lidar system 20 is coaxially arranged on the input axis of the GSE 32.

Such a tight integration of the components generally results in both GNSS and lidar sub-systems 18 and 20 measuring the velocities and accelerations at the same time, as synchronised by the GNSS, and from the same stabilised platform 16, and therefore more accurate determination of the acceleration due to gravity compared to "loosely integrated" measurements.

It is to be appreciated that the GNSS or GPS satellite navigation system receiver 18 can also either be "loosely integrated" or "tightly integrated" with the gravimeter 14 and the Doppler lidar system 20. In a tight integration, the GNSS receiver 18 is mounted directly on the platform 16 to allow accurate alignment with the input axis of the GSE 32, i.e. the GNSS receiver is coaxially arranged on the input axis of the GSE 32.

Of course, it is further to be appreciated that variations on the above-described "loose" and "tight" integrations or couplings are possible and within the scope of the present disclosure. For example, the lidar system 20 can be mounted directly on the gravimeter 14, instead of on the stabilised platform 16, which may allow more accurate measurements than when the lidar system 20 is "loosely" integrated, as above, but not as accurate as when mounted on the platform 16. Similarly, the GNSS receiver 18 can also be mounted on either the aircraft 10, the platform 16, or the gravimeter 14, such various mountings likely to yield differences in accuracy.

In one example, the GNSS receiver 18 is configured to operatively measure a vertical kinematic acceleration of the assembly 14. As shown, the assembly 14 also generally includes a second GNSS receiver 24 which is operatively located distal from the assembly 14 to allow differential processing of vertical kinematic acceleration measurements from the first GNSS receiver in the aircraft 10.

With regard the Doppler lidar system 20, such a system generally includes a laser generator that produces a single frequency laser beam, and a frequency modulator arranged in signal communication with the laser generator. In use, the frequency modulator receives the laser beam from the laser generator, and linearly modulates the frequency of the laser beam to produce a triangular waveform with a high degree of linearity. The Doppler lidar system 20 also typically includes an amplifier arranged in signal communication with the frequency modulator, the amplifier configured to receive and amplify a first portion of the modulated laser beam.

In the current examples, the Doppler lidar system includes three photo transceivers 26 arranged in communication with the amplifier, with each photo transceiver 26 configured to transmit a part of the first portion of the amplified laser beam from the amplifier, and to subsequently receive reflected radiation from such transmitted laser beam.

Each photo transceiver 26 is then configured to mix the received reflected radiation with a part of a second portion of the modulated laser beam for optical heterodyne detection. In addition, each of the photo transceivers 26 is aimed to transmit the laser beam in a different direction, and are arranged stationary relative to each other.

When in use, the received reflected radiation from each part of the transmitted first portion of the laser beam is compared with a second portion of the modulated laser beam to determine a frequency difference between the frequency of the received reflected radiation and the frequency of the modulated laser beam to determine the vertical velocity of the assembly 14 and/or the aircraft.

It is further to be appreciated that the present disclosure also includes an associated gravimetry method. Such a method broadly comprises the steps of mounting the gravimeter assembly 14, as described, in the aircraft 10, flying a gravimetry survey with the aircraft 10, and synchronising both the gravimeter and lidar measurements during the survey with the time signal from the GNSS receiver 18, so that a gravitational acceleration measurement of the gravimeter 14 is differentially isolable from a kinematic acceleration derivable from the synchronous lidar measurement.

It is to be appreciated by the skilled addressee that the examples above are typically provided with reference to a 3-axis stabilised gravimeter, however the present invention is equally applicable to Strapdown Inertial Navigation System (SINS) gravimeters, excluding any particular restriction, limitation and/or configuration impeding the use of such a gravimeter, as will be readily apparent to the skilled addressee.

Applicant believes it particularly advantageous that, if the aircraft's vertical accelerations are determined to a level that is no more accurate than is possible using existing GPS alone, as per conventional methods, then there will still be significant advantages in that it will be possible to calculate the acceleration due to gravity on board the aircraft in close to real time. In addition, the range of the aircraft would be extended beyond the range between the first and second GNSS receivers 18 and 24.

Similarly, if determination of the aircraft's vertical accelerations is more accurate than is possible using GPS alone, then this will additionally result in determination of the scalar gravity response with improved resolution, or improved accuracy, or both.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well known technologies are not described in detail, as such will be readily understood by the skilled addressee.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

It is to be appreciated that reference to "one example" or "an example" of the invention, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise. Variations (e.g. modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

Any method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A gravimeter assembly comprising:
   a gravimeter;
   a three-axis stabilised platform with an accelerometer having a vertically arranged input axis to prevent signal contamination from horizontal accelerations;
   at least one global navigation satellite system (GNSS) receiver arranged in signal communication with the gravimeter, said GNSS receiver and/or a suitable antenna thereof coaxially arranged on the input axis; and
   a Doppler lidar system arranged in signal communication with the gravimeter and coaxially arranged on the input axis, the lidar system configured to determine a vertical velocity of the assembly at a predetermined time, a time signal from the GNSS receiver operatively synchronising both gravimeter and lidar measurements, so that a gravitational acceleration measurement of the gravimeter is differentially isolable from a kinematic acceleration derivable from the synchronous lidar measurement.

2. The gravimeter assembly of claim 1, wherein the Doppler lidar system includes a laser generator that produces a single frequency laser beam, and a frequency modulator arranged in signal communication with the laser generator.

3. The gravimeter assembly of claim 2, wherein the frequency modulator receives the laser beam from the laser generator, and linearly modulates the frequency of the laser beam to produce a triangular waveform with a high degree of linearity.

4. The gravimeter assembly of claim 3, wherein the Doppler lidar system includes an amplifier arranged in signal communication with the frequency modulator, said amplifier configured to receive and amplify a first portion of the modulated laser beam.

5. The gravimeter assembly of claim 4, wherein the Doppler lidar system includes at least one photo transceiver arranged in communication with the amplifier, said photo transceiver configured to transmit a part of the first portion of the amplified laser beam from the amplifier, and to subsequently receive reflected radiation from such transmitted laser beam.

6. The gravimeter assembly of claim 5, wherein the Doppler lidar system includes at least three photo transceivers.

7. The gravimeter assembly of claim 6, wherein each photo transceiver is configured to mix the received reflected radiation with a part of a second portion of the modulated laser beam for optical heterodyne detection.

8. The gravimeter assembly of claim 7, wherein each of the at least three photo transceivers are aimed to transmit the laser beam in a different direction, and are stationary relative to each other.

9. The gravimeter assembly of claim 8, wherein the received reflected radiation from each part of the transmitted first portion of the laser beam is compared with a second portion of the modulated laser beam to determine a frequency difference between the frequency of the received reflected radiation and the frequency of the modulated laser beam to determine the vertical velocity of the assembly.

10. The gravimeter assembly of claim 1, wherein the GNSS receiver is configured to operatively measure a vertical kinematic acceleration of the assembly.

11. The gravimeter assembly of claim 10, wherein the assembly includes a second GNSS receiver operatively located distal from the assembly to allow differential processing of vertical kinematic acceleration measurements from the first GNSS receiver.

12. The gravimeter assembly of claim 1, wherein the GNSS receiver and Doppler lidar system are mounted on the gravimeter.

13. The gravimeter assembly of claim 1, wherein the GNSS receiver and Doppler lidar system are mounted on the three-axis stabilised platform.

14. An aircraft comprising the gravimeter assembly of claim 1.

15. The aircraft of claim 14, wherein the GNSS receiver has a clear view of the sky at a top of the aircraft, with the Doppler lidar system having a clear view of the ground below the aircraft.

16. An unmanned aerial vehicle (UAV) comprising the gravimeter assembly of claim 1.

17. A gravimetry method comprising the steps of:
   mounting the gravimeter assembly of claim 1 in an aircraft;
   flying a gravimetry survey with the aircraft; and
   synchronising both the gravimeter and lidar measurements during said survey with a time signal from the GNSS receiver, so that a gravitational acceleration measurement of the gravimeter is differentially isolable from a kinematic acceleration derivable from the synchronous lidar measurement.

\* \* \* \* \*